(12) United States Patent
Jin et al.

(10) Patent No.: US 9,740,049 B2
(45) Date of Patent: Aug. 22, 2017

(54) LIQUID CRYSTAL DISPLAY PANEL AND LIQUID CRYSTAL DISPLAY DEVICE

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventors: Ji Jin, Beijing (CN); Ku Hyun Park, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 224 days.

(21) Appl. No.: 14/362,014

(22) PCT Filed: Aug. 22, 2013

(86) PCT No.: PCT/CN2013/082065
§ 371 (c)(1),
(2) Date: May 30, 2014

(87) PCT Pub. No.: WO2014/146396
PCT Pub. Date: Sep. 25, 2014

(65) Prior Publication Data
US 2015/0261028 A1    Sep. 17, 2015

(30) Foreign Application Priority Data

Mar. 22, 2013   (CN) .......................... 2013 1 0094910

(51) Int. Cl.
G02F 1/13363    (2006.01)
G02F 1/1335     (2006.01)
(Continued)

(52) U.S. Cl.
CPC ....... *G02F 1/13363* (2013.01); *G02B 5/3083* (2013.01); *G02F 1/133514* (2013.01);
(Continued)

(58) Field of Classification Search
CPC ........... G02F 1/13363; G02F 1/133514; G02F 1/133528; G02F 1/133634;
(Continued)

(56) References Cited

U.S. PATENT DOCUMENTS

2005/0140900 A1    6/2005   Jeon et al.
2007/0188686 A1    8/2007   Yano et al.
(Continued)

FOREIGN PATENT DOCUMENTS

CN    1777834 A    5/2006
CN    1954252 A    4/2007
(Continued)

OTHER PUBLICATIONS

International Preliminary Report on Patentability issued Sep. 22, 2015; PCT/CN2013/082065.
(Continued)

*Primary Examiner* — Angela Davison
(74) *Attorney, Agent, or Firm* — Ladas & Parry LLP

(57) ABSTRACT

A liquid crystal display panel and a liquid crystal display device, the liquid crystal panel including a color filter sheet and a liquid crystal layer, an optical compensation film layer being disposed between the color filter sheet and the liquid crystal layer. With the optical compensation film layer inside the liquid crystal panel, contrast ratio is increased in a full-viewing-angle direction, and color shift in a diagonal direction of the liquid crystal pane is alleviated; further, the optical compensation film layer is provided on the color filter sheet of the liquid crystal panel, leading to a compact structure of the liquid crystal panel, reducing production (Continued)

costs and decreasing light leakage and mura phenomenon that are caused by light reflection and refraction; gray level, contrast ratio, color phase or the like of an LCD can be also improved.

4 Claims, 2 Drawing Sheets

(51) Int. Cl.
G02B 5/30 (2006.01)
G02B 5/32 (2006.01)
(52) U.S. Cl.
CPC .. G02F 1/133528 (2013.01); G02F 1/133634 (2013.01); *G02B 5/3025* (2013.01); *G02B 5/3041* (2013.01); *G02F 2001/133565* (2013.01); *G02F 2001/133631* (2013.01); *G02F 2413/01* (2013.01); *G02F 2413/11* (2013.01)
(58) Field of Classification Search
CPC ........ G02F 2001/133565; G02F 2001/133631; G02F 2413/01; G02F 2413/11; G02F 2413/02; G02F 2413/06; G02F 2413/08; G02B 5/32; G02B 5/3025; G02B 5/3083; G02B 5/3041; Y10T 428/1041
USPC .............. 349/96, 117, 119, 120; 359/489.07, 359/483.01, 485.01–485.04; 428/1.31
See application file for complete search history.

(56) References Cited

U.S. PATENT DOCUMENTS

| | | |
|---|---|---|
| 2008/0259255 A1 | 10/2008 | Chae et al. |
| 2009/0087590 A1* | 4/2009 | Aiki .......................... C08J 5/18 428/1.1 |
| 2010/0134448 A1 | 6/2010 | Park et al. |
| 2010/0220273 A1* | 9/2010 | Nakajima ......... G02F 1/133634 349/117 |
| 2013/0229588 A1* | 9/2013 | Nishida ............. G02F 1/133634 349/33 |

FOREIGN PATENT DOCUMENTS

| | | |
|---|---|---|
| CN | 101051154 A | 10/2007 |
| CN | 101290419 A | 10/2008 |
| CN | 101846829 A | 9/2010 |
| CN | 101943825 A | 1/2011 |
| JP | 2006-285014 A | 10/2006 |

OTHER PUBLICATIONS

Second Chinese Office Action dated Sep. 28, 2015; Appln. No. 201310094910.6.
First Chinese Office Action Appln. No. 201310094910.6; Dated Apr. 28, 2015.
International Search Report dated Dec. 23, 2013; PCT/CN2013/082065.

\* cited by examiner

LIQUID CRYSTAL DISPLAY PANEL AND LIQUID CRYSTAL DISPLAY DEVICE

TECHNICAL FIELD

Embodiments of the present invention relate to the technical field of a liquid crystal display, and more particularly to a liquid crystal display panel and a liquid crystal display device.

BACKGROUND

With the continuous development of LCD (Liquid Crystal Display) display technology, people's demand for the quality of LCDs is increasing. A liquid crystal panel with a viewing angle reaching to the degree of a wide-viewing-angle panel is becoming more and more attractive to people.

In a conventional technology, a liquid crystal panel using whether an ADS type or an IPS type technology suffers a problem of color shift in diagonal directions. FIG. 1 illustrates a conventional liquid crystal display, comprising an upper polarizer 1, an upper glass substrate 2, a color filter sheet 3, a protective film layer 4, a liquid crystal layer 5, a lower polarizer 6 and a lower glass substrate 8. The upper polarizer 1 comprises an upper polarizer outer cellulose triacetate (TAC) thin film 10, an upper polarizer polarizing thin film 11 and an upper polarizer inner cellulose triacetate (TAC) thin film 12; the lower polarizer 6 comprises a lower polarizer outer cellulose triacetate (TAC) thin film 60, a lower polarizer polarizing thin film 61 and a lower polarizer inner cellulose triacetate (TAC) thin film 62. A back matrix 31 is disposed on the color filter sheet 3. At present, in order to resolve the color-shift problem of liquid crystal panels, a structure including a compensation film outside the upper glass substrate is often used, but this design is prone to cause technical problems such as light leakage and uneven brightness due to light reflection and refraction.

In order to solve the above problems, beneficial improvements have been made by the present invention.

SUMMARY

An embodiment of the present invention provides a liquid crystal panel, the liquid crystal panel comprising a color filter sheet and a liquid crystal layer, an optical compensation film layer being disposed between the color filter sheet and the liquid crystal layer.

In the liquid crystal panel, the optical compensation film layer comprises a C-plate compensation film and an A-plate compensation film, the optical compensation film layer is provided on a lower surface of the color filter sheet, and the C-plate compensation film is provided between the color filter sheet and the A-plate compensation film.

Further, a range of a vertical phase delay Rth of the C-plate compensation film is: 100 nm<Rth<150 nm; and A range of a horizontal phase delay Re of the A-plate compensation film is: 200 nm<Re<300 nm.

For example, the vertical phase delay Rth of the C-plate compensation film is 138 nm; and the horizontal phase delay Re of the A-plate compensation film is 274 nm.

In the liquid crystal panel, the liquid crystal panel further comprises an upper polarizer and a lower polarizer; the upper polarizer comprises an upper polarizer polarizing thin film and an upper polarizer inner cellulose triacetate thin film, the upper polarizer inner cellulose triacetate thin film is provided between the upper polarizer polarizing thin film and the color filter sheet, a range of a vertical phase delay Rth of the upper polarizer inner cellulose triacetate thin film is from 0 nm to 10 nm, and a horizontal phase delay Re of the upper polarizer inner cellulose triacetate thin film is 0 nm; the lower polarizer comprises a lower polarizer polarizing thin film and a lower polarizer inner cellulose triacetate thin film, the lower polarizer inner cellulose triacetate thin film is provided between the lower polarizer polarizing thin film and the liquid crystal layer, a range of the vertical phase delay Rth of the lower polarizer inner cellulose triacetate thin film is from 0 nm to 10 nm, and the horizontal phase delay of the lower polarizer inner cellulose triacetate thin film is 0 nm.

For example, the vertical phase delay Rth of the upper polarizer inner cellulose triacetate thin film is 0 nm; and the vertical phase delay Rth of the lower polarizer inner cellulose triacetate thin film is 0 nm.

For example, a range of a phase delay Δnd of the liquid crystal layer is from 320 nm to 420 nm.

For example, the phase delay Δnd of the liquid crystal layer is 392.7 nm.

The embodiment of the present invention further provides a liquid crystal display device, and the liquid crystal display device comprises the above liquid crystal panel.

Figure 1:
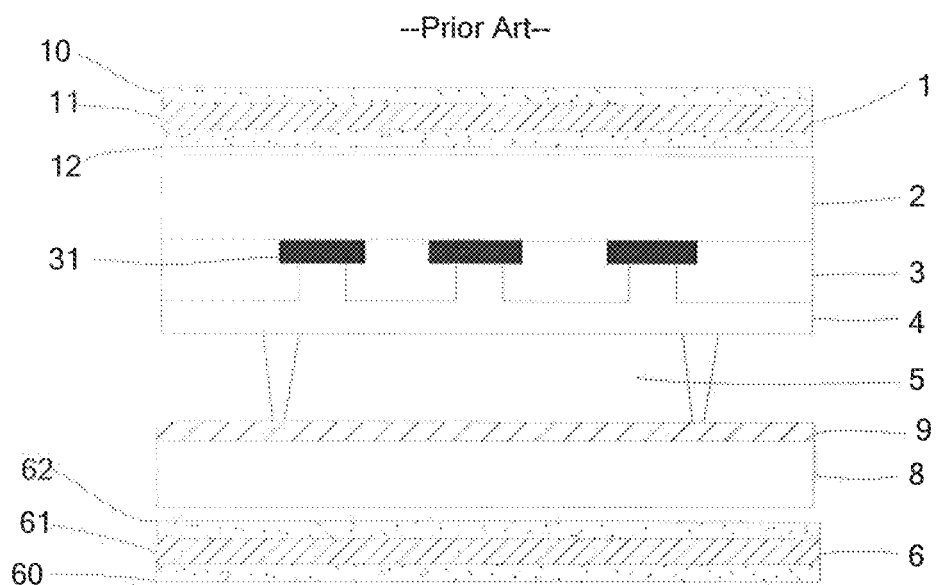
FIG. 1 is a schematic view illustrating a structure of a conventional liquid crystal display.

In the drawings, a list of components represented by respective labels is as follows:

1: upper polarizer; 10: upper polarizer outer TAC thin film; 11: upper polarizer polarizing thin film; 12: upper polarizer inner (TAC) thin film; 2: upper glass substrate; 3: color filter sheet; 31: black matrix; 4: protective film layer; 5: liquid crystal layer; 6: lower polarizer; 60: lower polarizer outer TAC thin film; 61: lower polarizer polarizing thin film; 62: lower polarizer inner TAC thin film; 7: optical compensation film layer; 71: C-plate compensation film; 72: A-plate compensation film; 8: lower glass substrate; 9: thin film transistor driving line layer.

DETAILED DESCRIPTION

With reference to accompanying drawings, embodiments of the present invention will be described in detail in the following.

Figure 2:
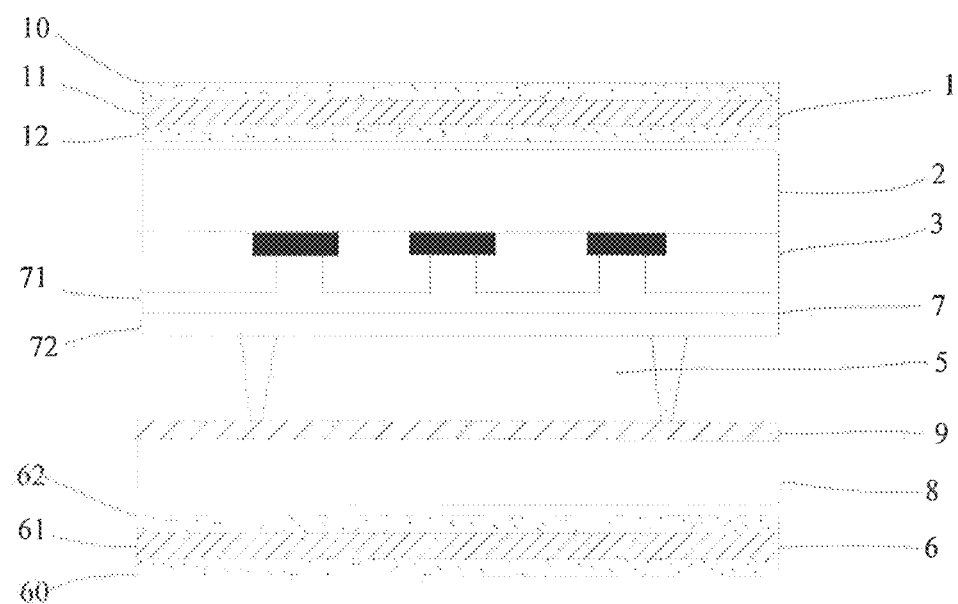
FIG. 2 is a schematic view illustrating a structure of a liquid crystal panel provided by an embodiment of the present invention.
Figure 3:
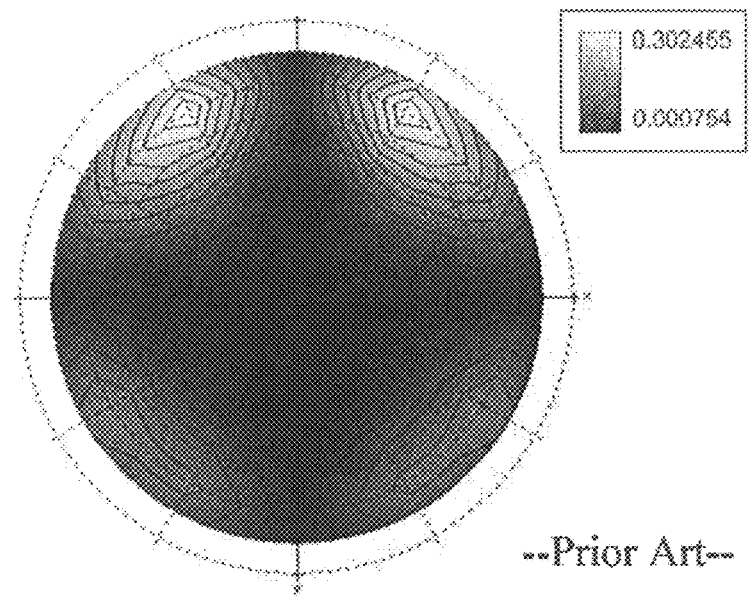
FIG. 3 is a schematic diagram illustrating a color-shift simulation result of the conventional liquid crystal display.
Figure 4:
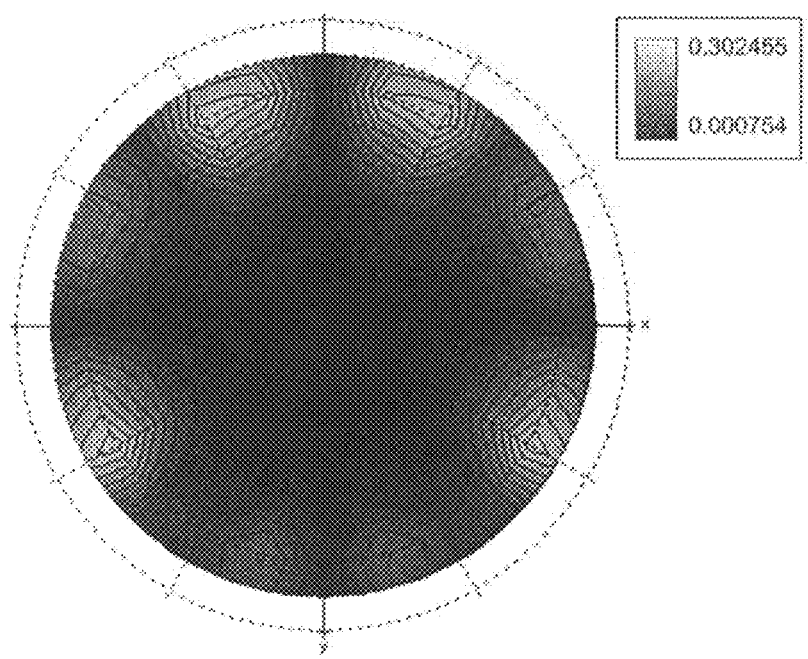
FIG. 4 is a schematic diagram illustrating a color-shift simulation result of the liquid crystal panel provided by an embodiment of the present invention.

As illustrated in FIG. 2, an embodiment provides a liquid crystal panel, the liquid crystal panel comprising an upper polarizer 1, an upper glass substrate 2, a color filter sheet 3, a liquid crystal layer 5, a lower polarizer 6 and a lower glass substrate 8; a thin film transistor driving line layer 9 is disposed between the liquid crystal layer 5 and the lower glass substrate 8; an optical compensation film layer 7 is disposed between the color filter sheet 3 and the liquid crystal layer 5. The optical compensation film layer 7 performs a function of eliminating color shift based on theoretical calculation of an optimal phase difference. As indicated in FIG. 3 and FIG. 4, in a liquid crystal panel without disposing an optical compensation film, the color-shift problem is greater; but in the liquid crystal panel provided by the embodiment, whether an ADS (Advanced-Super Dimension Switch) type or an IPS (In-Plane Switching) type liquid crystal panel, the color-shift problem can be well resolved.

The above-mentioned optical compensation film layer 7 can be disposed outside the protective film layer 4 below the color filter sheet 3, and can also replace the protective film layer 4 directly. For example, the embodiment can employ a structure in which the optical compensation film layer 7 is disposed on a lower surface of the color filter sheet 3 to replace the original protective film layer and function as a protective thin film. The optical compensation film layer 7 is disposed inside a cell of the liquid crystal panel, namely, of an In-Cell structure. As illustrated in FIG. 2, the optical compensation film layer 7 comprises a C-plate compensation film 71 and an A-plate compensation film 72, and the optical compensation film layer 7 is coated on the lower surface of the color filter sheet 3; the C-plate compensation film 71 is provided between the color filter sheet 3 and the A-plate compensation film 72. In the embodiment, a proper phase difference is calculated based on the following 4×4 optical formula theory of Berreman:

The relation of a tangent component of a cutoff wave is shown by a differential equation:

$$\frac{d\psi}{dz} = -ik_0\Delta(z)\psi$$

$$\psi = (E_X, H_Y, E_Y, -H_X)^T, k_0 = \frac{\omega}{c}$$

□: 4×4 matrix showing propagation property of a biaxial medium

Properties of the medium are illustrated by using a transfer matrix:

$$\psi(z+h) = p(h)\psi(z)$$

$$p(h) = \exp(ik_0 h\Delta) = \beta_0 + \beta_1\Delta + \beta_2\Delta^2 + \beta_3\Delta^3$$

p: 4×4 transfer matrix of the biaxial medium
h: thickness of the medium
$\beta_0, \beta_1, \beta_2, \beta_3$: shown by using eigen values of $\Delta$
There are totally four eigen values of $\Delta$

| transmitted waves - 2 | 2 × 2 matrix mode |
| reflected waves - 2 | 2 × 2 matrix mode |

By calculation according to the above formulas, the optimal phase difference of the optical compensation film layer is obtained:

A range of a vertical phase delay Rth of the C-plate compensation film is: 100 nm<Rth<150 nm;

A range of a horizontal phase delay Re of the A-plate compensation film is: 200 nm<Re<300 nm.

In order to find out the optimal value for resolving color shift proposed by the embodiment, a Matlab program can be employed to calculate, and the 4×4 optical formulas of Berreman are applied to the theory used in calculating. When the vertical phase delay Rth of the C-plate compensation film is 138 nm, and the horizontal phase delay Re of the A-plate compensation film is 274 nm, the display effect of liquid crystal is optimal.

In the liquid crystal panel, the upper polarizer 1 comprises an upper polarizer outer TAC thin film 10, an upper polarizer polarizing thin film 11 and an upper polarizer inner TAC thin film 12; the upper polarizer inner TAC thin film 12 is provided between the upper polarizer polarizing thin film 11 and the color filter sheet 3; a range of a vertical phase delay Rth of the upper polarizer inner TAC thin film 12 is 0-10 nm; and a horizontal phase delay Re of the upper polarizer inner TAC thin film 12 is 0 nm.

The lower polarizer 6 comprises a lower polarizer outer TAC thin film 60, a lower polarizer polarizing thin film 61 and a lower polarizer inner TAC thin film 62; the lower polarizer inner TAC thin film 62 is disposed between the lower polarizer polarizing thin film 61 and the liquid crystal layer 5; a range of the vertical phase delay Rth of the lower polarizer inner TAC thin film 62 is 0-10 nm; and the horizontal phase delay Re of the lower polarizer inner TAC thin film 62 is 0 nm. When both the vertical phase delay Rth of the upper polarizer inner TAC thin film 12 and that of the lower polarizer inner TAC thin film 62 are 0 nm, the liquid crystal panel can increase display contrast ratio, well eliminate color shift in a diagonal direction of the liquid crystal panel and achieve an optimal display effect.

In the embodiment, a range of a phase delay Δnd of the liquid crystal layer included in the liquid crystal panel is 320-420 nm; and when the phase delay Δnd of the liquid crystal layer is 392.7 nm, the display effect of the liquid crystal panel is optimal.

In the embodiment, a liquid crystal display device is further provided, and the liquid crystal display device comprises the above liquid crystal panel. Because the liquid crystal panel comprises the optical compensation film layer, the liquid crystal display device has better display effect, increases display contrast ratio in a full-viewing-angle direction, and has a function of eliminating color shift in a diagonal direction of ADS liquid crystal.

The embodiments of the present invention provide a liquid crystal panel and a liquid crystal display device using an In-Cell (inside a glass substrate) technology to dispose an optical compensation film layer, so that the color-shift problem in a diagonal direction of the liquid crystal panel is resolved.

Compared with a conventional technology and product, the present invention is advantageous in the following aspects:

1. Embodiments of the present invention, by employing a structure of an optical compensation film layer inside a liquid crystal panel, perform a function of increasing contrast ratio in a full-viewing-angle direction, and have a function of eliminating color shift in a diagonal direction of the liquid crystal panel;

2. The embodiments of the present invention, by providing the optical compensation film layer on a lower surface of a color filter sheet of the liquid crystal panel, lead to a compact structure of the liquid crystal panel, reduce production costs and decrease light leakage and mura phenomenon (a phenomenon that brightness of a display is uneven, causing all kinds of traces) caused by light reflection and refraction;

3. The optical compensation film layer employed by the embodiments of the present invention can also improve gray level, CR (Contrast Ratio: contrast ratio of a display) and color phase of an LCD.

The above embodiments are only used to describe the present invention and not limitative to the present invention; those skilled in the relevant art can make various variations and modifications without departing from the spirit and scope of the present invention; therefore, all equivalent technical solutions belong to the scope of the present invention; the scope of the present invention are defined by the claims.

The invention claimed is:

1. A liquid crystal panel, comprising a color filter sheet and a liquid crystal layer, wherein an optical compensation film layer is disposed between the color filter sheet and the liquid crystal layer;

wherein the optical compensation film layer comprises a C-plate compensation film and an A-plate compensation film, and the optical compensation film layer is provided on a lower surface of the color filter sheet, the C-plate compensation film being provided between the color filter sheet and the A-plate compensation film;

the vertical phase delay Rth of the C-plate compensation film is 138 nm; and the horizontal phase delay Re of the A-plate compensation film is 274 nm;

wherein the liquid crystal panel further comprises an upper polarizer and a lower polarizer respectively provided on two sides of the liquid crystal layer;

the upper polarizer comprises an upper polarizer polarizing thin film and an upper polarizer inner cellulose triacetate thin film, the upper polarizer inner cellulose triacetate thin film being provided between the upper polarizer polarizing thin film and the color filter sheet, a vertical phase delay Rth of the upper polarizer inner cellulose triacetate thin film being 0 nm, a horizontal phase delay Re of the upper polarizer inner cellulose triacetate thin film being 0 nm;

the lower polarizer comprises a lower polarizer polarizing thin film and a lower polarizer inner cellulose triacetate thin film, the lower polarizer inner cellulose triacetate thin film being provided between the lower polarizer polarizing thin film and the liquid crystal layer, a vertical phase delay Rth of the lower polarizer inner cellulose triacetate thin film being 0 nm, a horizontal phase delay of the lower polarizer inner cellulose triacetate thin film being 0 nm;

a range of a phase delay $\Delta nd$ of the liquid crystal layer is from 320 to 420 nm.

2. The liquid crystal panel as claimed in claim 1, wherein the phase delay $\Delta nd$ of the liquid crystal layer is 392.7 nm.

3. A liquid crystal display device, comprising a liquid crystal panel according to claim 1.

4. The liquid crystal device as claimed in claim 3, wherein the phase delay $\Delta nd$ of the liquid crystal layer is 392.7 nm.

* * * * *